United States Patent [19]

Etani

[11] Patent Number: 4,530,120
[45] Date of Patent: Jul. 23, 1985

[54] METHODS AND APPARATUS FOR BATHING

[76] Inventor: Kenji Etani, P.O. Box 206, West Townsend, Mass. 01474

[21] Appl. No.: 136,033

[22] Filed: Mar. 31, 1980

Related U.S. Application Data

[60] Division of Ser. No. 40,302, May 18, 1979, abandoned, and a continuation-in-part of Ser. No. 934,425, Aug. 17, 1978, abandoned, which is a continuation of Ser. No. 717,514, Aug. 25, 1976, abandoned, which is a continuation-in-part of Ser. No. 591,536, Jun. 30, 1975, abandoned.

[51] Int. Cl.³ .............................................. A47K 3/00
[52] U.S. Cl. ........................................ 4/538; 4/228; 210/765
[58] Field of Search ................ 422/264–266; 210/62, 169, 51, 59, 749, 765, 633; 4/222, 228, 948, 584, 538, 191; 222/167, 168.5, 169; 137/268; 239/55, 57–59, 310–318; 34/60; 209/5

[56] References Cited

U.S. PATENT DOCUMENTS

| | | | |
|---|---|---|---|
| 429,384 | 6/1890 | Hanwarnig | 422/265 |
| 2,826,484 | 3/1958 | Buchler | 422/265 |
| 3,633,538 | 1/1972 | Hoeflin | 422/265 |
| 3,677,408 | 7/1972 | Dinzo | 210/169 |
| 3,684,460 | 8/1972 | Arneson | 422/265 |
| 3,706,140 | 12/1972 | Brillord | 422/265 |
| 3,846,078 | 11/1974 | Brett | 422/264 |
| 3,924,807 | 12/1975 | Morgan | 422/265 |

Primary Examiner—Hiram H. Bernstein
Attorney, Agent, or Firm—Gilbert L. Wells; Jack Larsen

[57] ABSTRACT

For water treatment in swimming pools, cooling towers, hot tubs, and other systems it is desired to feed various chemicals in small quantities but at optimum rates into the system. In several embodiments of the invention the water is recirculated through the system which usually includes a filter. It has been discovered that the chemicals can be fed by enclosing them in generally spherical plastic capsules suggestive of table-tennis balls, but about the size of a base ball. The rate of feeding depends upon the size and number of small holes which are provided, or the user pokes through the shell of the capsule, upon the solubility of the chemical, and upon the flow rate of the water through a strainer, skimmer, or other chamber in the system into which the capsule is introduced. The random orientation of the capsule tends to average out variations. In other embodiments, the capsule is weighted to direct the small holes upward as it rests in quiet water, thereby substantially stopping the flow of chemical; but as the water is sloshed about in use, the chemical is dispensed at a rate proportional to the amount of use. Safety, convenience, and economy are among the asserted advantages. Invention is seen in the new use of such capsules for the purposes indicated.

12 Claims, 11 Drawing Figures

METHODS AND APPARATUS FOR BATHING

This application is a Division of my application Ser. No. 040,302, which is filed 5/18/79 now abandoned is a continuation-in-part of my now abandoned application Ser. No. 934,425 filed Aug. 17, 1978, which was a continuation of application Ser. No. 717,514 filed on Aug. 25, 1976, which is now abandoned and was a continuation-in-part of my application Ser. No. 591,536, Filed June 30, 1975 and now abandoned.

This invention relates to water quality and more particularly to methods and apparatus for feeding controlled amounts of chemicals such as chelating agents, perfumes, microbiocides and filtration aids to hot tubs, spas, cooling towers, swimming pools, and the like.

In home swimming pools, and in the newly popular hot tubs and spas it is almost always necessary to filter and recirculate the water and to add certain chemicals such as organic flocculating agents which can greatly improve the effectiveness of filters in removing impurities.

Whether it be the chlorination or fluoridation of drinking water supplies, the addition of organic flocculants, to improve the effectiveness of filters, or the addition of chelating agents to limit the formation of scale in boilers, it is known to provide apparatus known as a "feeder" to meter predetermined amounts of such chemicals into the water. This is done in large public and commerical systems; but the necessary capital investment for such equipment has been impractical, for the operator of a home pool or small cooling tower. To make up for the lack of automatic equipment the users of such small systems have been obliged to forego their advantages of the chemicals or to maintain a veritable chemistry laboratory with bottles of chemicals, many of them corrosive or poisonous, and apparatus to measure and mix them.

The present invention in its various embodiments provides automatic controlled administration of chemicals without the expense of feeders, and provides for the safe handling of the chemicals by unskilled persons.

It has been discovered that many of the desired water treatment chemicals can be packaged and shipped enclosed in sealed plastic spheres of handy size. For use, one or more small holes are opened in the shell and the sphere with chemical enclosed is dropped into the water system. It has been further discovered that the motion of the water, and of the sphere in the water can produce the desired rate of chemical feeding.

In one embodiment, the capsule is used to add alum to the water of a backyard swimming pool. Dropped into the skimmer basket it introduces alum at a substantially constant rate proportional to the rate of flow and independent of the amount of undissolved alum remaining in the capsule. Although at any instant the dispensing rate from the capsule will depend upon the position of the tiny holes relative to the flow, the position effect is eliminated, on the average, because of the movement of the capsule. The invention may be perceived as providing an improved swimming pool. A pool with the feeder capsule is a better pool, cleaner, more economical, more easily maintained than pools of the prior art; but, although this may be its place legalistically in the framework of statutory classes of the patent law, only in this technical sense is there an improved swimming-pool system. The invention seems better to fit the category of "new use" as a method of water treatment.

The problem of classification also creates problems of joinder of invention. It has been found that the new use has many embodiments, each a method of water treatment but somewhat different as to the structure of the capsule, the point of application, the chemical composition dispensed, and the system treated. The above-mentioned abandoned co-pending parent application and this application relate to swimming pools and other bathing systems wherein the feeder capsule is placed in the skimmer basket or other "intermediate-velocity chamber" and the chemical is extracted by the flow as water is pumped through the chamber, causing the capsule to move about and stir its contents. A second divisional application Ser. No. 136,156 relates to the use of the feeder capsules in the art of treating swimming pool water.

The application Ser. No. 040,302, of which these are divisions is directed particularly toward new uses of the invention with air washers, cooling towers, and the like wherein the chemical is extracted by flow; but in a different kind of intermediate-velocity chamber, and in which the feeder is weighted so that in conditions of no flow, feeding is not just reduced, but substantially cut off, and uses wherein the flow is generated by random sloshing around in use.

The primary object of the invention is to provide the means by which the advantages of water treatment chemicals can be made available in relatively small water systems.

Another object of the invention is to provide safe containers for the storage and shipment of dangerous water-treatment chemicals; and a related object is to provide means for using these chemicals that are both simple and safe.

A further object is to provide means for meeting the utilitarian requirements of the use, in a neat, orderly, and attractive way.

It has been found that the new use has many embodiments.

In swimming pools, in addition to alum for filtration, the method may be used to add flocculants, chelating agents, and microbiocides, by introducing appropriate capsules into the skimmer basket. A thin film of cetyl alcohol to limit evaporation, or a thin film of perfume oils may be maintained on the pool surface by floating a capsule in the pool that responds to the wave action of pool use to replenish the films.

In hot tubs and spas where the water of the tub is vigorously agitated by air and water jets the chemicals may be administered by dropping the capsules, (which, because of the tiny holes, are safe for body contact) directly into the tub with the bather. In most cases it will be preferred to treat via the skimmer basket which is present in typical American spas and hot tubs.

Cooling towers and air washers are treated by addition of microbiocides for algae and bacteria, and chemicals for inhibiting corrosion and scale formation. In each case, a capsule is introduced into the water collecting basin, or other chamber with sufficient depth, and the chemical is extracted by the flow.

The accumulation of fuel on the bilgewater of power boats presents a serious fire hazard which is reduced by adding a capsule of non-ionic emulsifier, which is released slowly as it rolls around when the craft is under way. Any fuel which may be present is dispersed in the bilgewater with a reduction of both flammability and fire potential.

Small amounts of agricultural chemicals can be applied to lawn, trees, and shrubs using a garden hose connected through an "intermediate-velocity chamber" designed to accept capsules, designed to dispense the chemicals into the flow.

For household plants, nutrients may be administered from a capsule dropped into an ordinary sprinkling can, the capsule being arranged to release the chemical only as the water is sloshed about.

The invention, accordingly lies in the new methods and the novel arrangements which include dispensing containers which are adapted to, and contribute to the success of the methods. The invention in its various aspects will, therefore, in part be obvious, and in part will be apprehended from the following specifications in conjunction with the annexed drawings of which:

FIG. 1 is a schematic diagram of a typical home swimming pool system as used for the invention, FIG. 2 is a drawing of a section through a form of the dispensing container of the invention, approaching depletion of the chemical, FIG. 3 is a drawing of an alternative construction of the container, as preferred in some uses, shown empty.

FIG. 4 is a drawing of a second alternative construction with a nonrefillable closure, FIG. 5 is a cut-away view of the form of container preferred in most uses, FIG. 6 is a schematic diagram of a typical home spa system as used for the invention, FIG. 7 is a schematic diagram of a typical cooling tower system as used for the invention, FIG. 8 is a drawing of a lawn sprinkler arranged for the invention, FIG. 9 is a drawing partly in section, along lines 9—9 and 9'—9' of FIG. 10.

Figure 1:
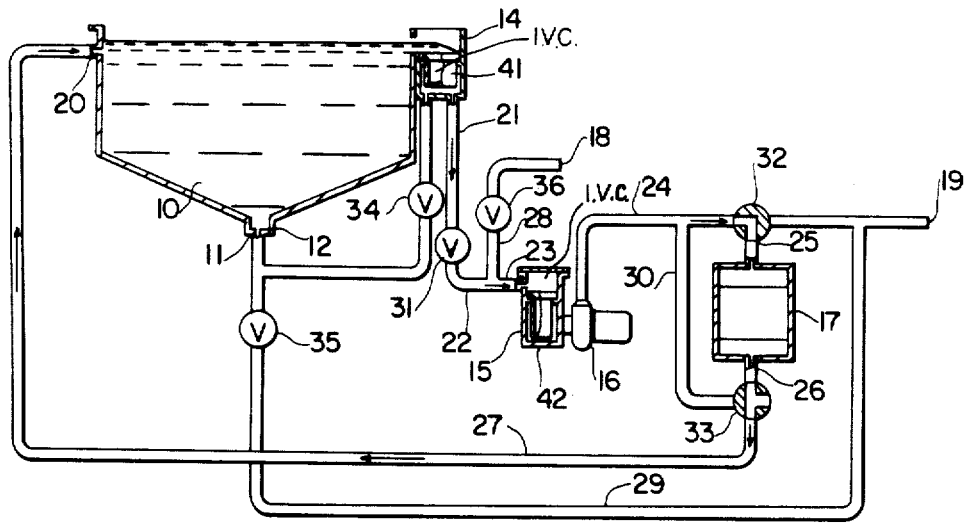

As indicated in FIG. 1, a typical swimming-pool comprises a pool 10, which has a drain 11 and sump 12 at the bottom of the pool, a skimmer 14 which carries away overflow and collects floating debris, a strainer 15 at the inlet to a pump 16, a filter 17, a water main 18, source of fresh water, a system outlet 19, and a pool inlet 20. Pipes 21-30 and valves 31-36 connect all.

In normal operation, water is taken from the pool through the skimmer 14, the pipe 21, the valve 31, pipes 22 and 23, strainer 15, pump 16, pipe 24, valve 32, pipe 25, filter 17, pipe 26, valve 33, and pipe 27 back to the pool inlet 20. Valve 34 allows water to be recirculated in whole or in part from the bottom drain 11, and valve 35 allows water to be gravity-dumped through the pipe 29 to the system outlet 19. Valve 36 connects the main 18 to replenish through pipes 28 and 23. The valves 32 and 33 may be turned to backwash the filter 17 via pipe 30. The skimmer 14 is arranged to collect leaves and other floating debris. To prevent the plugging of the pipes 21, 22, 23 and pump 16, the skimmer 14 has perforated basket 41 of larger diameter and the strainer 15 has a strainer basket 42. While the flow velocity in the baskets is much less than that in the pipes, it is still perceptible . . . and non-uniform so that when a container of chemical of the kind shown in FIGS. 2-5 is dropped into the perforated basket in the skimmer or into the strainer basket it bobs or flutters with the flow through the baskets. The feeder may be inserted at these places or a special chamber. We may call these generically "intermediate velocity chambers", designated I.V.C. in FIG. 1, and they must have a cross-sectional area at least twice that of the feeder so the feeder does not obstruct the flow, and should not be greater than one-hundred times the feeder cross section if there is to be a perceptible stream velocity.

Figure 2:
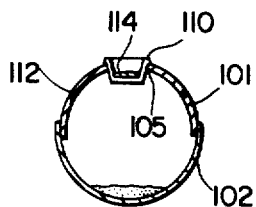

FIG. 2 is representative of a practical embodiment for a dispensing container for coagulants, hereinafter termed a "feeder". The feeder comprises two plastic hemispheres 101, 102 which are joined together in the manner of some table tennis balls with cement. The hemisphere 101 has a filling hole 105, which is closed by a plug 110. For dispensing the chemical, there are a number of small, holes 112 in the hemisphere 101. Plug 110 has a porous buoyant portion 114.

Figure 3:
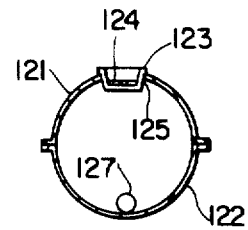

FIG. 3 represents a construction in which two hemispheres 121 and 122 are joined at a flange. The thermoplastic hemispheres with flanges can be made easily by the vacuum-forming process. This is the preferred construction when polyvinyl chloride (PVC) is used, or when the filling chemical is compressed into a solid ball "brickette". The flange closure is readily achieved by ultrasonic welding, and the flange assists the rotation of the feeder in the eddies of flow. It also facilitates the handling and packaging of the feeders. The body of chemical, or an added weight 127 tends to stabilize the upward orientation of the feeder holes in conditions of low flow.

Figure 4:
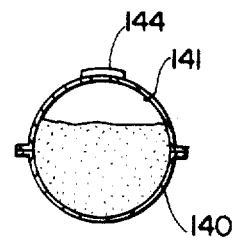

FIG. 4 represents an alternate closure of the feeder of FIG. 3. In this construction the feeder is filled by the supplier with a desired quantity of chemical 140, leaving an empty space 141, and sealed with a patch 144. The empty space may be filled with inert gas for chemicals which may be degraded in the presence of air or moisture. With this construction, the user must make the proper number of dispensing holes by piercing the feeder with a needle or the like.

Figure 5:
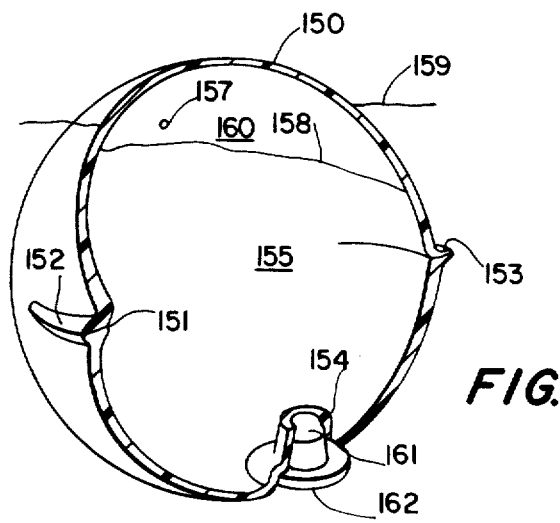

FIG. 5 is a cut-away drawing of the capsule configuration preferred for most swimming pool and spa uses. The sphere is blow molded of high density polyethylene. Twenty-two grams of the polymer are needed for a sphere 2¾ inches in diameter. The shell 150 varies somewhat in thickness between about one sixteenth and one eight of an inch. The mold is made in two parts. When molding is complete the sphere is left with a small hole at 151 and a pair of stub wings 152 and 153 which serve the function of the flange in the configuration of FIG. 3. In preparation for filling, the blow hole 151 is closed, and the filling hole 154, formed in the mold, is cleanly cut through, both operations using an ultrasonic tool. The figure represents the capsule as filled with an emulsion 155 of perfume oil, mineral oil, isopropyl myristate and a spreading agent. It is desired that this capsule float with each dispensing hole 157 near the liquid levels inside 158, and outside 159, the capsule when it is resting in still water. To achieve this result, an air space 160 is left after filling with the emulsion, and a zero-gauge buck shot 161 is swaged into the filler plug 162.

As in the case of the composition just described, it is possible to dispense oil-soluble chemicals into water without creating an oily film on the water by means of the invention. The oil with dissolved chemical is added with emulsifying agent and some water to the capsule as above; but sometimes the emulsion tends to separate into three layers, oil at the top, emulsion in the middle, and water at the bottom. When this happens, it may be desirable to place the feed hole at the *bottom* of the capsule near the weight 161. When the capsule is violently agitated the emulsification is complete. When it is quiet enough for separation, both the oil and the flotation bubble are completely contained by an intervening layer of water between them and the dispensing hole or holes.

Figure 6:
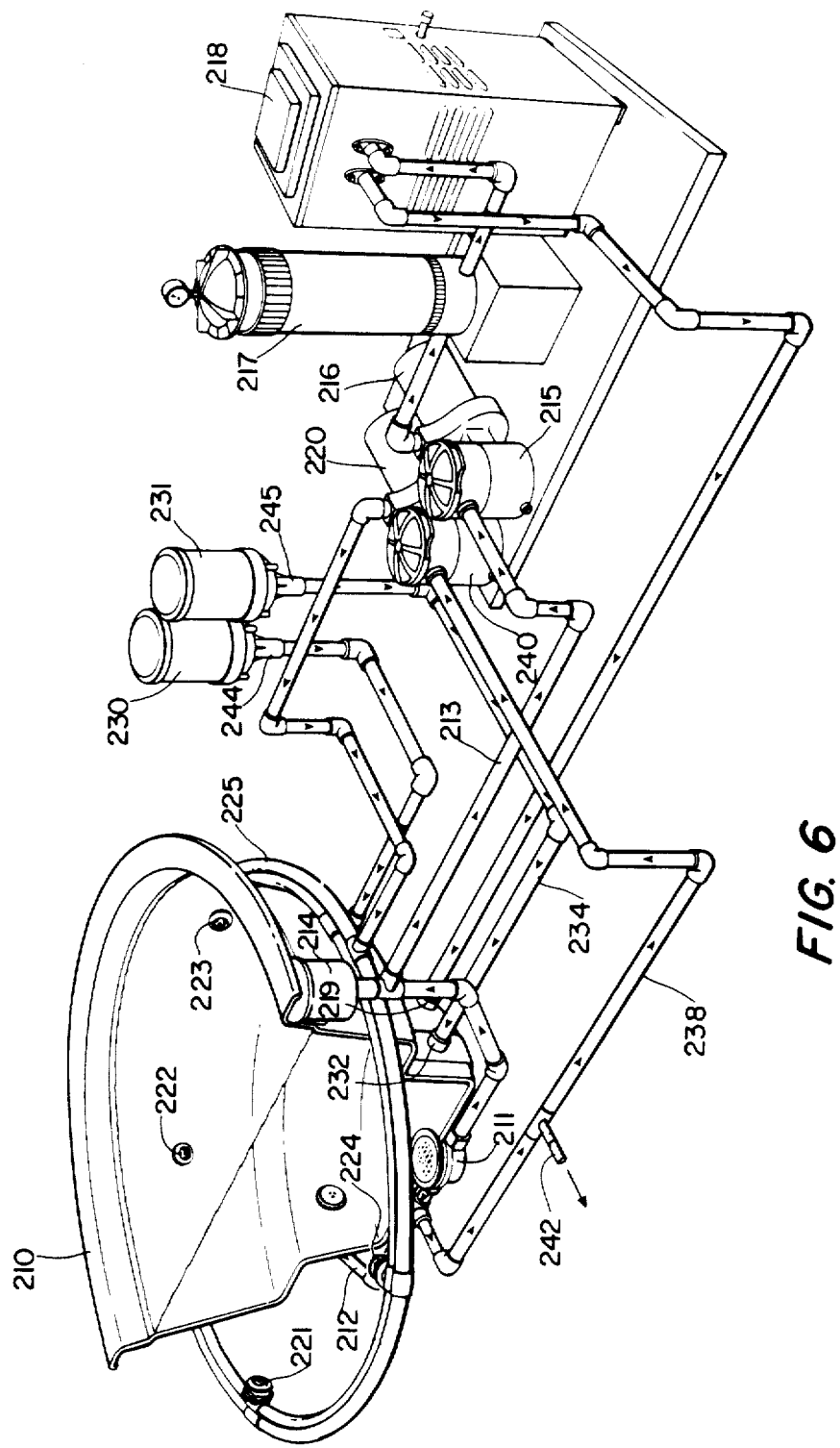

FIG. 6 is a drawing representative of a so-called "spa" showing the features which characterize such systems. A decendant of Roman and Japanese baths, of the sauna, the therapeutic "whirlpool" bath, and hot springs, the spa provides a setting for communal bathing in warm water with the active stimulation of vigorous jets of water and air. The hot tub is a close relative of the spa, characterized by classical construction in the form of a large round wooden vat with a simple wooden bench. The spa, built up of concrete, tile, or fiberglass has more comfortable seating, and more flexible shape, seating arrangement, and plumbing. The spa of FIG. 6 has all of the common features but it must be understood that in the pleasure business taste is everything; so users may do without features, or add, as the spirit moves them. The system of FIG. 6 has a tub 210 which has a main drain 211 at the bottom. Water is returned through pipe 213 from the drain 211 and a skimmer 214 to a strainer 215, and a water pump 216. From the pump 216 the water goes through a filter 217, a water heater 213, and returns to the tub at inlet 219. A second pump 220 called a "booster pump" propels water forcefully from jets 221-224. An air pump 230 feeds air to the water jets 221-224 in a ventury connection whereby a large quantity of air is entrained in the jets of water. A second air pump 231 is connected to an air jet 232 that blows air directly into the water in the tub by way of the pipe 234. Water is returned from the tub by way of return line 238 and strainer 240 to the booster pump 220. Supply water may be added, and the system drained by the pipe 242.

The power of the air and water pumps amounts to about ten watts per liter and is sufficient to agitate the water thoroughly. As a result, a dispensing capsule of the type described above dispenses chemicals into a spa system whether dropped into the skimmer basket to respond to the flow produced by the filter pump 216 or into the tub 210 to be buffeted by the water jets from the booster pump 220.

It is the vigorous activity of the water that characterizes the spas and hot tubs, clearly distinguishes them from other baths and swimming pools. I have, therefore adopted the term "dynamic bathing system" to be generic of spas, hot tubs, whirlpool baths, and the like regardless of the means by which the agitation is achieved. I characterize a bath as a "dynamic bathing system," if the kinetic energy of the water excedes three joules per liter, exclusive, of course, of the energy of translation, such as that imparted when the tub as a whole is carried in a vehicle.

The amount of kinetic energy can be estimated from the pumping power applied to the system and the time it takes to reach full turbulence after the power is turned on.

Spas have many water-treatment problems in common with swimming pools. Capsules filled with flocculants, chelating agents, or microbiocides are preferably applied at the skimmer basket 214 but also may be dropped into the tub.

The activity of the water sometimes calls for a defoaming agent, since soap suds are not desired in a spa. A capsule of the kind shown in FIG. 5 and filled with a solution of defoaming agent may be placed in skimmer basket or tub. Very little chemical is required, so that enough may be dispensed from a single small (0.026") hole, and last for two weeks or more.

Because of the high temperature, chlorine is inappropriate as a germicide in hot tubs and spas. A suitable low toxicity germicide is polyvinylpyrollidone-iodine marketed under the trade name Povidone-Iodine (PVPI). The capsule feeder provides a convenient means for adding this compound to hot-tub and spa systems.

Perfume capsules of the kind illustrated in FIG. 5 are desired for spas; and for them the desired point of application is the tub itself. The perfume oils tend to separate from the water; but the motion of the capsule with the emulsifying agent and isopropyl myristate, breaks it down into droplets small enough to escape the capsule. The spreading agent has a molecule which at one end attaches to the water, and at the other end attaches to the oil, thereby tending to spread the oil in a thin film. One small hole has been found to provide a sufficient rate of feeding for most tastes. It is speculated that in the churning water of the spa rapid pressure changes may flex the thin walls of the feeder and expel the perfume by an "oil can" effect.

Figure 7:
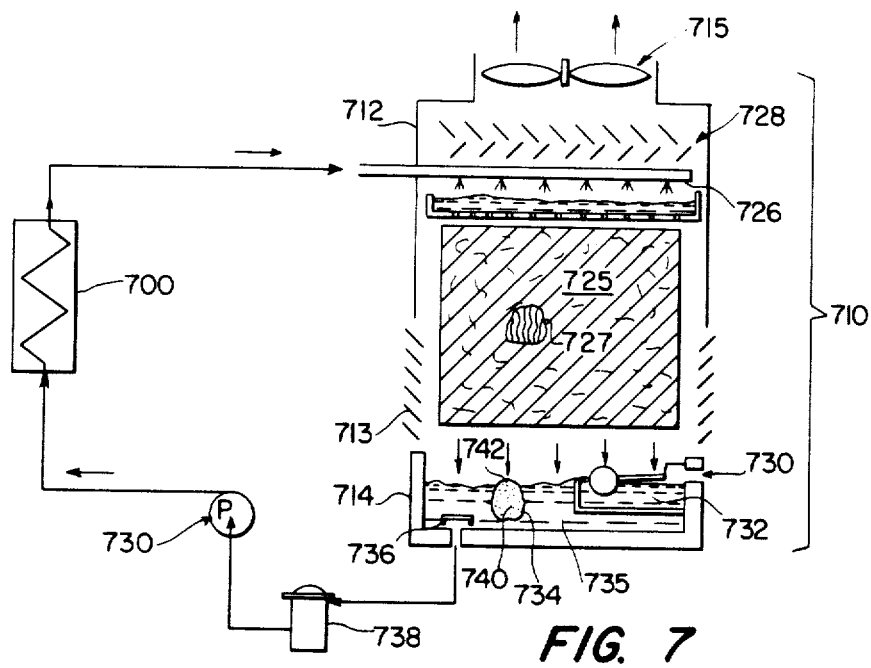

Referring now to FIG. 7 which illustrates a typical cooling-tower loop in an open recirculating system. The cooling tower is a very effective device for interacting air and water. In a cooling tower the water gives up its heat in part by conduction and in part by evaporation. The air also gives up to the water, dirt and bacteria, spores, and slimes. Water comes from a closed heat exchanger 700 usually inside a building and is delivered to the cooling tower 710 usually situated on the roof. It has an enclosure 712 which at the sides is made up largely of louvers 713 tilted to admit air and return spray to the inside. At the bottom is a collecting basin 714 and at the top there may be a fan 715 to accelerate the flow of air through the tower. Most of the interior space is occupied by what is termed the "fill" 725, or "wet deck structure". What the fill is made of depends upon a number of chemical and economic factors. If the tower is on the ground it may be heavier than if the tower is atop a skyscraper. Whatever the construction, the function is the same. The water that enters at the top is distributed across the top of the fill by a distribution system 726. From there it is desired that the water descend in laminar flow spread out in thin sheets flowing over the fill, exposed all the way to a countercurrent of air, which must be free to flow up through the fill 725 and the distribution system 726. Ribbed plastic sheets 727 (shown in a cut-out) sometimes form the fill. In this form of tower, it is desired that the water present maximum area to the air, but as film, not droplets. There is, however some unavoidable droplet formation and to recapture these, drift eliminators 728 are placed at the top. There is, however some considerable loss of water by evaporation. It is convenient to control the addition of make up water supplied at 730 by means of a float valve 732 situated in the collecting basin 714. The collecting basin is one of the places suitable to receive a water treatment capsule 734 in an embodiment of the present invention, shown free to move about in the body 735 of water. From the basin water passes through the drain 736 to a strainer 738, a possible point for insertion of a capsule, then to a pump 730 then back to the heat exchanger.

Whatever the construction of the fill it is the closest to heaven that slimes and algae, and some bacteria can ever know—warm, and moist, and dark with a constant stream of goodies arriving by air and water. It has been found that a cooling tower for air conditioning provides a breeding ground for the rare and deadly bacteria of "Legionaires' Disease". Unattended, algae and slime soon clog the fill or the heat exchanger and piping. The accumulation of mineral scale is another problem to be avoided by water treatment. There is an established business wherein trained water-quality technicians travel from plant to plant to test cooling-tower water and add appropriate chemicals. The cost of this service is, however, uneconomic for small towers such as those of air conditioners in the under one-hundred ton range, often found in supermarkets and the like. Using the capsules and methods of this invention it is practical to treat these small systems. The relatively unskilled store personnel may be entrusted to add capsules every week according to a professionally prepared plan.

A very close relative to the cooling tower is the "air scrubber". In an air scrubber there is a distribution system, a working volume (which may be either a fill or a spray chamber) where air and water come together with a large area of contact, and a collecting basin as for the cooling tower. By the interacting flows of air and water, the air is cooled, purified, and humidified then returned to sustain animal life or a process requiring clean air. Alternatively dirty process air may be scrubbed before release to the atmosphere to comply with environmental regulations. Scrubbers have many of the same water treatment problems as cooling towers, and this invention provides similar solutions. For lack of a better generic term, scrubbers and cooling towers may be together termed "air-water interfacers". The water treatment for air-water interfacers calls for larger treatment capsules. It is desired to lengthen the maintenance cycle, and the collecting basin typically might accommodate a sphere six inches in diameter or larger.

It has been found that making the sphere larger also requires making it thicker, if safety in shipment is to be preserved, molding becomes more expensive, and so on. It has been found that in the present state of the art, the cost per pound of chemical encapsulated for the present invention is minimized at a capsule diameter of about 3½ inches. In this case, the "large economy size" is not necessarily cheaper. With the development of automatic filling and packaging machinery for the somewhat smaller capsules desired for swimming pools and hot tubs, it is unlikely that capsules for air-water interfacers will be larger than four inches diameter. But it is desired to enclose a maximum weight of water soluble chemical within the available diameter. Accordingly the optimum arrangement for cooling tower scale and corrosion inhibitors, and microbiocide is a bricketted ball 740 of solid chemical three inches in diameter, enclosed between flanged hemispheres, as shown in FIG. 7, three and one-half inches in diameter. The hemispheres are formed with dimples 742 formed as the filling hole 154 in FIG. 5, is formed to center the brickette and cushion it in shipment. To extend the time between additions of chemicals, an increased number of capsules, each with a fewer number of dispensing holes, or smaller dispensing holes, is added rather than a larger capsule.

Figure 8:
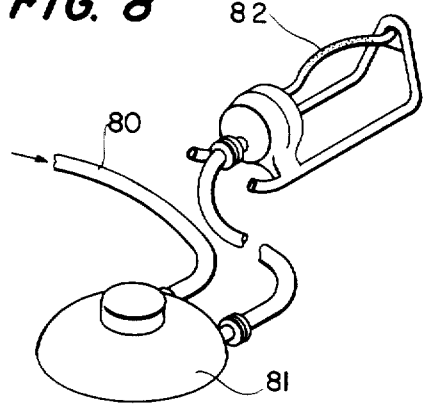
Figure 9:
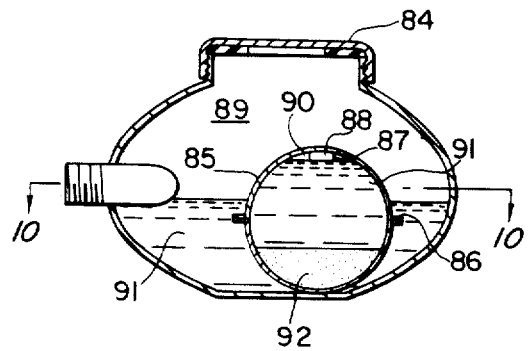
Figure 10:
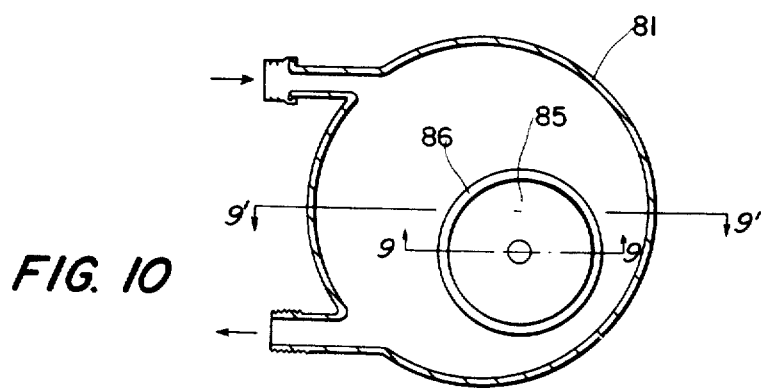
FIG. 10 is a plan view, partly in section of the chamber of FIG. 9.

FIG. 8 illustrates another use of the invention. Water from a garden hose 80 is directed through an intermediate-velocity mixing chamber 81 and on to a water sprinkler 82. As shown in FIG. 9 the chamber 81 has a screw top 84, and contains a water-treatment feeder capsule 85 also shown in FIG. 10 with room enough to roll around in the chamber as the water runs.

The capsule 85 is made of two hemispheres, preferably fastened together by ultrasonic welding forming a flange 86. One hemisphere is provided with a dimple 87. The bottom of this dimple is thinned because of the nature of the vacuum forming process used to produce the hemispheres. A feed hole 88 is conveniently pierced at that point. A dry chemical is introduced into the capsule before the halves are welded together preferably by bricketting the chemical to fit the lower hemisphere. This makes the capsule relatively childproof prior to use. After water 97 enters the container, the chemical nearest to the pierced dimple 87 dissolves first and three layers are formed within the capsule, i.e., the pocket 90 of entrapped air around the recess, the chemical solution 91 in the middle, and the yet undissolved solid chemical 92 on the bottom. When the water is turned off and there is no flow through the chamber 81, the capsule is in repose with the lighter dimpled side upward and the heavier solid chemical side down. Chemical feeding into the system except by diffusion is virtually stopped. When the water is turned on the capsule rolls with the current and the solution is released through the feed hole or holes and rapidly mixes with the water to the sprinkler. The yet undissolved chemical remains in the bottom of the capsule. In this case it may sometimes be desired to release chemical at a rate so great that the solution 91 becomes substantially less than saturated. The feed rate then becomes dependent upon the exposed area of the chemical. Fortunately the stability is greatest when the area is greatest, and least when the area is least so that the feed rate tends to remain constant, even though saturation is not complete.

The chamber may be provided with back-siphonage, back flow preventer (not shown) such as Watts No. 8 (made by Watts Regulator Co., Lawrence, Mass. U.S. Pat. No. 3,171,423) to maintain the water inside at a certain level as illustrated in FIG. 9 for a prolonged period of time after the flow has stopped. The feeding is stopped completely since the feed hole is above the liquid level inside and outside the capsule.

Figure 11:
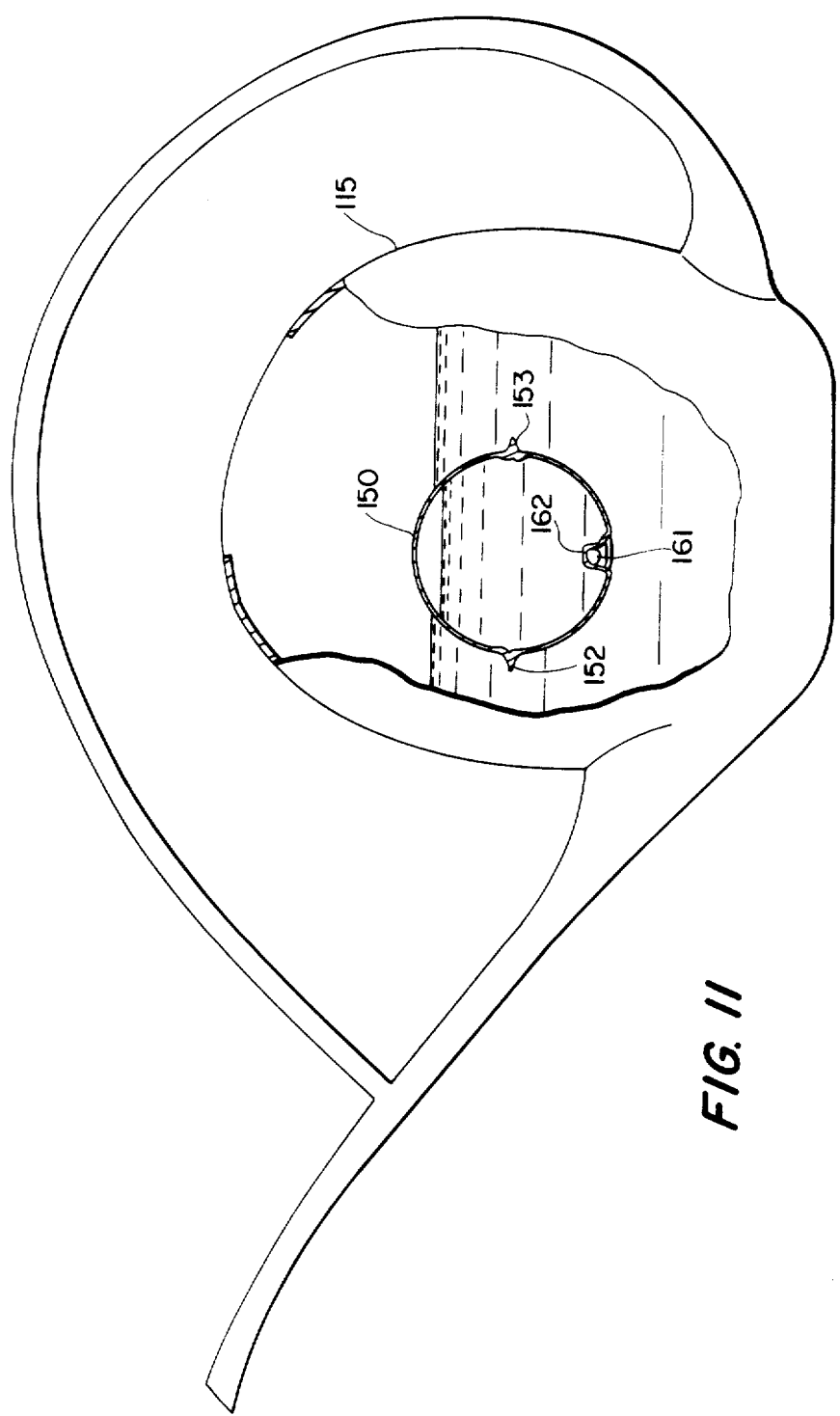
FIG. 11 illustrates use of the invention using a horticulturist's watering can.

FIG. 11 represents the use of the invention to supply chemicals which are needed in minute amounts by plants under the care of a horticulturist and watered by hand. It may be preferable to use a spouted container 115 made of chemically inactive plastic.

In this case, the capsule 150 used is the same as that preferred for the use as shown in FIG. 5. It becomes especially important that the capsule have the wings 152,153 so that angular motion results in tilting of the capsule 150. There is considerable feeding of chemical into the water when the can is filled at the faucet (not shown), and additional feeding as the sprinkler is used. There is, therefore proportionality to the number of plants, the number of waterings, and the amount of water used. Considering the wide range between the necessary and tolerable concentration of micronutrients and the like, the method provides a happy compromise between ignoring the need, and making it a fetish.

The feed holes are "small holes". They are not mere pores easily clogged. For definiteness, the range is: less than. 3 square mm. area, but greater than 0.005 inches diameter.

Having thus described the methods and apparatus of the invention, a catalog of capsules and chemicals may be pertinent:

Type A. PVC capsule 2.75" diameter filled with alum and a small proportion of ultra-high molecular weight flocculant MAGNIFLOC 985N, made by American Cyanamid, three to four feed holes 0.026", for use in swimming-pool skimmer basket Type B. Blow-molded "Lexan" capsule filled with low molecular weight liquid cationic polymer flocculant solution, MAGNIFLOC 572-C made by American Cyanamid. Two or three feed holes 0.026" for use in swimming-pool skimmer basket or spa.

I deem this the preferred embodiment of the invention.

Type C. Like all capsules unless otherwise specified, 2.75" diameter of PVC filled with nitrilotriacetate,NTA, and ethylenediamine tetra-acetate, EDTA, made by W. R. Grace and Co. The chelating agents inactivate scale and scum-causing metallic ions, such as calcium and magnesium. Placed in strainer basket of pool or spa, the chemical treats first the piping, heater, and pumps where most needed.

Type D. Blow-molded of "Lexan" or high-density polyethylene, filled with 60% concentration of microbiocide, Poly[oxyethylene(dimethyliminio)ethylene(dimethyliminio)ethylene dichloride] made by Buckman Laboratories. Applied to skimmer basket of pool or spa, or sump of cooling tower to control algae. Small feed holes, up to 0.1% of feeder surface aggregate area.

Type E. Evaporation retarder and heat retainer. Blow-molded polycarbonate or high-density polyethylene. Contains a dispersion of cetyl alchohol in water which spreads to form a molecular layer over the water. Weighted, it is placed in pool or tub, dispensing a small quantity of the chemical whenever the surface is disturbed. Reduces humidity problems and heating costs for indoor pools.

Type F. Defoaming. Blow-molded polyethylene filled with 25% concentration of defoaming agent such as 71-D5 or 7453 "Antifoam" made by NALCO Chemical Company. Placed in skimmer basket or tub of a dynamic bathing system, it suppresses the formation of suds.

Type G. Germicide. Blow-molded polyethylene feeder contains germicide for dynamic bathing systems such as polyvinylpyrollidone-iodine, marketed under the trade name Povidone-Iodine (PVPI).

Type H. Microbiocide. Blow-molded polyethylene filled with 30% active ingredients, 15% sodium dimethyldithio carbamate and 15% "Nabam" made by Alco Chemical Co. For Cooling towers and the like.

Type J. Corrosion Inhibitor. Formed of vacuum-formed PVC flanged hemispheres 3½ inches in diameter. Filled with 3 inch diameter ball brickette, NALCO 360, comprising chromates and other inhibitors. Placed in sump of cooling tower or the like.

Type K. For scale and corrosion in general service water. PVC 3½ inch diameter filled with ball brickette 3" diameter, NALCO 936, a blend of polyphosphates and polyvalent ions Placed in cooling-tower collecting basin and the like.

Type L. For lawnsprinkler. PVC 3½" diameter or 2¾ inch diameter filled with brickette of garden chemicals such as fungicides, herbicides, insecticides, wetting agents, and micronutrients such as chelated iron, manganese, copper, and zinc. Feed hole size may be as much as 0.2% of feeder surface.

Type M. For marine bilges. Blow-molded polyethylene feeder containing a nonionic surfactant such as produced by Sudbury Laboratories, Sudbury, Mass. To emulsify fuel with bilgewater, the capsule is weighted, so that the rate of feeding increases with the amount of bilge water and also with the amount of rolling and pitching of the craft. It replenishes the emulsifier when the bilge is pumped out.

Type N. For nurseries. A weighted feeder of blow-molded polycarbonate, contains a solution of 8-8-8 chloride-free fertilizer fortified with micronutrients iron, zinc, manganese, copper, boron, magnesium, and molybdenum. The solution has a color which indicates depletion. Placed in a watering can, the feeder rests with feed holes up when not in use. Chemical is added when the water is disturbed.

Type P. Perfume. Blow-molded polyethylene filled with emulsion of perfume oil, mineral oil, isopropyl myristate, and a spreading agent such as a polyoxyethelene polyol fatty acid ester. Weighted, and with air for floatation, the feeder spreads perfume on the surface of pool or tub, only when in use.

Type Q. Coloration. Blow-molded polyethylene feeder filled with solution of FDA approved food color to tint the water of a dynamic bathing system blue or blue-green. Because the chlorine and oxygen in the system gradually bleach out the color, it needs to be gradually made up by a feeder in the tub or skimmer basket.

Type R. Repellant. Similar to the Type P perfume feeder, this feeder is floated on an outdoor swimming pool to spread a molecular layer of insect repellant across the water surface in proportion to wave action, which approximates the need.

Type S. For slimes and algae. PVC, 3½" diameter feeder with 3" diameter ball-bricketted NALCO 7324, microbiocide plus penetrating and dispersing agents, for cooling towers etc.. The preferred composition is 10% methylene bisthiocyanate, 1% bis(tri-n-butyl tin)oxide, and remainder inert.

In the prior art it is known to place a fluid-treatment chemical in a container with holes small enough to keep a solid chemical inside, while allowing the fluid to pass through freely. The common tea bag is an example, as the spherical capsule and system shown in U.S. Pat. No. 2,543,075, or the plastic capsule of U.S. Pat. No. 3,633,538. It is also known for various kinds of feeders to float around in a swimming pool to dispense chlorine from solid chemical. U.S. Pat. No. 2,826,484 to Buehler is an example as is Canadian Pat. No. 612268 to MacMahon. MacMahon discloses a structure wherein there are two relatively small holes into the dispensing capsule, one at the bottom from which saturated solution feeds out driven by its increased density. The Buehler patent contemplates a similar mechanism, and suggests a substantial total area of dispensing holes, as is required for chlorine.

U.S. Pat. Nos. 2,543,075 to Friedrich and 3,120,015 to MacChesney disclose methods of feeding chemical by interposing a chamber in a hose line.

Only in the Patent to MacMahon is the size of the feed holes important. The smallest port diameter tested by MacMahon was two millimeters.

The present invention in all its embodiments involves a dispensing capsule that feeds chemical from one or more relatively small holes; and the rate of feeding at any instant depends upon the directions the feed holes are pointing relative to the surrounding flow and gravity. These directions change as the feeders are used, because of the construction of the feeder and the place of application in the system, and the random changing of the directions, creates new results not found in the prior art. Although a substantially spherical shape is preferred for the capsules, and the spherical shape has advantages in shipping and handling contributing to the practical value of the invention, there can be a departure from spherical without leaving the scope of the invention. Egg shape, might be good, indeed, the bird's egg, with porous shell and countless tiny holes is part of the prior art. In theory and in function, some chemical will be dispensed whatever the size of the capsules, or the size of the holes; but this invention relates more to useful arts than to science. The invention derives its value, not from "gee whiz!" performance; but from simple, practical, economical, and safe solutions to water-treatment problems. Because the steps of the new methods are simple and ambiguous, because the structures are known and simple, and the chemicals are employed for known effects, there is the possibility that language broad and general enough to define the invention in all its embodiments would also read on totally unrelated processes on a scale larger or smaller which do not teach this art and presently are unknown to me. I have, therefore, determined practical limits on the size of the feeder capsules, and practical operable ranges for the hydrodynamics of the several systems as a basis for the appended claims. It is not suggested that these limits are critical or absolute, or that the invention would be inoperable outside of these ranges. The limits are based upon present and foreseen costs and available technology.

As pointed out above, the invention is not for large quantities of chemicals, nor is it for very small amounts where the cost of packaging would excede the value of chemical saved. The practical minimum size feeder is in the range of half a cubic inch to 1.5" diameter. For swimming pools and dynamic bathing systems, the maximum practical size is about four inches diameter or 35 cubic inches. For cooling towers, the present optimum size is dictated by the availability of 3 inch diameter ball brickettes, for which 35 cubic inches is sufficient. Speculating that it may be practical to make the brickettes larger if they are individually encapsulated, 70 cubic inches is a possibility for cooling towers and scrubbers.

A diameter of $2\frac{3}{4}$ inches is preferred for capsule types A,B,C,D,E,F,G,H,L,M,N,P,Q, and R. $3\frac{1}{2}$ inch diameter is preferred for types J,K, and S.

The preferred feed-hole size is about 0.026" for all types except Type L, where a larger hole may be desired.

Feed holes as small as 0.005 inches, and as large as three square millimeters are considered to fall within the invention.

For types D,H,J,K, and S in air-water interfacer service the feed holes may aggregate as much as 0.1% of capsule area within the invention, so also for type L. For others, the aggregate area will not excede 0.02% of the surface area.

The required number of feed holes depends upon flow rate and size of the system being treated, and is usually between one and five, with twenty-five selected as an upper limit, unless the number is multiplied by using a screen or mesh.

In every embodiment of the invention, the rate of chemical feeding is substantially reduced, or cut off completely when the system is not in use. This distinguishes the invention from the addition of chlorine from capsules that quietly float around in a swimming pool. Agitation or some intermediate velocity of flow stimulates the feeding. The invention is also to be distinguished from the above-mentioned patents to MacChesney and Friedrich where the chemical is interposed directly in a high-velocity stream, and wherein the capsule has no room to roll about to change its orientation.

The concept of an "intermediate-velocity chamber" has been useful in describing the method of feeder operation. The term is generic to the skimmer basket, the pump strainer, or a chamber associated with a filter in the systems of FIGS. 1 and 6, or to the pump strainer or collecting basin of FIG. 7, or to the Chamber 81 of FIG. 8, and to any other chamber which might be introduced for the purpose which is large enough to accomodate the feeders without substantial blockage of the flow, and which never-the-less is small enough in cross-section so that the flow velocity is sufficient to cause the feeder to roll, or bob, or flutter with the flow. For definiteness the chamber size might be specified as bearing a relationship to the size of the feeder. In the foregoing examples the flow is a flow *through* the chamber and depends on the flow rate and the size of the chamber. But it is not the flow through the chamber that is important, but the flow impinging on the feeder. The tub in a dynamic bathing system falls within the definition of an intermediate-velocity-chamber, even if the turbulence is created primarily by the injected air. Similarly, the sprinkling can of FIG. 11 is an intermediate-velocity chamber when water tumbles in from a tap, or as it is sloshed about in use. At those times the flow is sufficient to roll the ball into dispensing attitudes.

The term "tank" is adopted as generic for the large receptacles for water including the tub, the pool, and the basin.

It will be recognized that the foregoing embodiments are merely exemplary of the invention, and that modifications and extensions will be obvious which do not depart from the scope of the invention as defined by the following claims:

I claim:

1. The method of feeding water treatment chemicals into a bathing system including
    (a) a tank,
    (b) a pump,
    (c) an intermediate-velocity chamber,
    (d) piping to interconnect said pump, tank, and chamber in a recirculating system, and
    (e) a quantity of water within said tank, pump, chamber, and piping, which method comprises the steps of:
    (1st) placing a feeder within said intermediate-velocity chamber of said system, and
    (2nd) subjecting said feeder to flow of said water at intermediate velocity thereby to extract a dose of chemical contained in said feeder at a controlled rate, wherein
    (i) said feeder is a compact container of volume between 0.1 and less than 24 cubic inches, resistant to attack by water and said chemical, perforated by a number of small holes each less than three square millimeters in cross section and greater than five thousandths of an inch (0.005") in diameter, and with an aggregate area of said holes less that 0.02% of the surface area of said feeder, and is close enough to spherical in shape and close enough to neutral in buoyancy dependant on said water velocity, that said flow causes said feeder to move about freely and roll, (ii) said chamber is of sufficient size to contain said feeder without substantial restriction of flow and to let said feeder move to stir its contents, and (iii) said dose comprises a chemical from the group consisting of flocculants, coagulants, microbiocides, chelating agents, defoamers, germicides, evaporation retarders, and dyes.

2. The method of claim one wherein said group consists of flocculants and coagulants.

3. The method of claim one wherein said system is a dynamic bathing system.

4. The method of claim one wherein said group consists of flocculants, coagulants, chelating agents, defoamers, and evaporation retarders.

5. The method of claim 2 wherein said chemical is a low-molecular-weight liquid cationic flocculant.

6. The method of claim 1 wherein said chemical comprises a microbiocide from the group consisting of Poly[oxyethylene(dimethyliminio)ethylene(dimethyliminio)ethylene dichloride] and bis(tri-n-butyl tin)oxide.

7. A bathing system comprising
   (a) a tank,
   (b) a pump,
   (c) an intermediate-velocity chamber,
   (d) piping to interconnect said pump, tank, and chamber in a recirculating system,
   (e) a quantity of water within said tank, pump, chamber, and piping, and
   (f) a feeder within said chamber comprising a shell containing a dose of water-treatment chemical,
   (g) wherein said feeder is small enough and close enough to spherical in shape and to neutral buoyancy dependant on the velocity of flow within said chamber, resulting from the operation of said pump, to be free to move about and roll in said water when said water is circulated by said pump,
   (h) wherein said feeder is of a volume between 0.1 and less than 24 cubic inches, is perforated by a number of holes each less than three square millimeters in cross section and greater than five thousandths of an inch (0.005") in diameter, and with an aggregate area of said holes less than 0.02% of the surface area of said feeder, and
   (i) wherein said chemical is a water-soluble solid, and the rate of feeding resulting from said velocity is low enough that the resulting solution of said chemical inside said shell remains substantially saturated while undissolved chemical remains therein, thereby to produce a substantially uniform rate of feeding.

8. The combination of claim 7 wherein said chemical is essentially alum.

9. The combination of claim 7 wherein said chemical comprises chelating agents from the group consisting of nitrilotriacetate and ethylene diaminetetracetate.

10. The process for adding a perfume oil lighter than water in small amounts to a body of water in a bath tub, comprising the steps of:
   (1st) providing a feeder in the form of a stiff waterproof shell having a volume of between 0.1 cubic inches and less than 24 cubic inches and perforated by a number of small feed holes each less than 3 square millimeters in area and greater than five thousandths of an inch (0.005") in diameter, and with an aggregate area of said holes less than 0.2% of the surface area of said shell, being filled with a dose of a chemical, and selected to have a number and size of holes to provide a desired rate of feeding of said oil, but weighted and buoyed so that when placed in still water, it reposes so that there is substantially no outflow of said chemical,
   (2nd.) placing said feeder so as to be free to move about and roll within said tub, and
   (3rd.) imparting motion to said body of water so that water impinges against said feeder with sufficient velocity to disturb its equillibrium, causing it randomly to move about and roll, thereby to extract said oil at a proportional rate,
   said feeder bing small enough and close enough to spherical in shape and neutral buoyancy that the velocity of said motion is sufficient to cause it to roll and move about in said tub, and
   wherein said feed holes are at the weighted bottom of said feeder.

11. The process of claim 10 wherein the number of said feed holes is but one, that one at the bottom of said feeder which is there weighted with a shot.

12. The method of claim one wherein said dose is a chemical compressed into a ball brickette, and sealed between hemispheres forming said feeder.

* * * * *